United States Patent
Han

(10) Patent No.: US 9,461,810 B2
(45) Date of Patent: Oct. 4, 2016

(54) MULTI-DROP CHANNELS INCLUDING REFLECTION ENHANCEMENT

(71) Applicant: SAMSUNG DISPLAY CO., LTD., Yongin, Gyeonggi-Do (KR)

(72) Inventor: Minghui Han, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/696,311

(22) Filed: Apr. 24, 2015

(65) Prior Publication Data

US 2016/0087782 A1    Mar. 24, 2016

Related U.S. Application Data

(60) Provisional application No. 62/052,400, filed on Sep. 18, 2014.

(51) Int. Cl.
*H04B 7/00* (2006.01)
*H04L 7/00* (2006.01)
*H04L 25/02* (2006.01)

(52) U.S. Cl.
CPC ........... *H04L 7/0008* (2013.01); *H04L 7/0091* (2013.01); *H04L 25/028* (2013.01)

(58) Field of Classification Search
CPC .................................. H04L 7/00; H04B 1/00
See application file for complete search history.

(56) References Cited

U.S. PATENT DOCUMENTS

| | | | |
|---|---|---|---|
| 7,564,695 B2 | 7/2009 | Matsumoto | |
| 8,283,571 B2 | 10/2012 | Lai et al. | |
| 8,749,535 B2 | 6/2014 | Kim et al. | |
| 2004/0125526 A1 | 7/2004 | Nagode et al. | |
| 2006/0146627 A1* | 7/2006 | Park | G11C 5/063 365/222 |
| 2009/0152689 A1 | 6/2009 | Nease | |
| 2009/0195327 A1* | 8/2009 | Cho | H01P 3/003 333/34 |
| 2010/0085084 A1* | 4/2010 | Kim | G09G 3/3648 327/108 |
| 2011/0284279 A1* | 11/2011 | Lai | H05K 1/0225 174/261 |
| 2014/0176412 A1 | 6/2014 | Oh | |
| 2015/0109227 A1 | 4/2015 | Shin et al. | |
| 2015/0207541 A1* | 7/2015 | Kuroda | H05K 1/0239 455/41.1 |

FOREIGN PATENT DOCUMENTS

| | | |
|---|---|---|
| EP | 1 326 302 A2 | 7/2003 |
| EP | 1 326 302 A3 | 11/2003 |
| GB | 1131115 | 10/1968 |
| JP | 2007-012661 | 1/2007 |
| KR | 10-2002-0013504 | 2/2002 |
| KR | 10-2002-0054900 | 7/2002 |

(Continued)

OTHER PUBLICATIONS

EPO Search Report dated May 12, 2015, corresponding to European Patent application 14196024.5, (8 pages).

(Continued)

*Primary Examiner* — Jaison Joseph
(74) *Attorney, Agent, or Firm* — Lewis Roca Rothgerber Christie LLP

(57) ABSTRACT

A clock channel to couple a transmitter to a plurality of receivers, the clock channel including: a transmission line to be coupled to an input of at least one receiver from among a plurality of receivers, the transmission line including: a reflection portion to reflect a clock signal propagating through the clock channel according to a clock frequency.

20 Claims, 6 Drawing Sheets

(56) References Cited

FOREIGN PATENT DOCUMENTS

| | | |
|---|---|---|
| KR | 10-2008-0022407 | 3/2008 |
| KR | 2010-0038825 | 4/2010 |

OTHER PUBLICATIONS

Office action dated Sep. 3, 2015, in cross reference U.S. Appl. No. 14/535,216 (16 pages).

\* cited by examiner

MULTI-DROP CHANNELS INCLUDING REFLECTION ENHANCEMENT

CROSS-REFERENCE TO RELATED APPLICATION

This utility patent application claims priority to and the benefit of U.S. Provisional Patent Application Ser. No. 62/052,400, filed Sep. 18, 2014, entitled "ELECTRICAL SIGNALING OF MULTI-DROP CHANNELS WITH FREQUENCY-SELECTIVE REFLECTION ENHANCEMENT ELEMENT" the entire content of which is incorporated herein by reference.

BACKGROUND

Forwarded clocking and embedded clocking are examples of two clocking methods used for high-speed serial links. In forwarded clocking, there is generally a dedicated electrical channel to send clock signals to receivers, which is then multiplied to the desired frequency. In embedded clocking, both data signals and clocks signals are transmitted through same electrical channels to the receivers, and the clock signals are embedded in a data stream to be extracted by the receivers using recovery circuitry.

Compared to embedded clocking, forwarded clocking may have better jitter performance, and may achieve higher data rates. However, in order to minimize or reduce overhead of clock pin assignments and routing, a multi-drop channel is generally used in forwarded clocking to transmit the clock signals. As a result, the achievable transfer rate of clock signals for the multi-drop channels may be lower than that of point-to-point channels used in embedded clocking.

The above information disclosed in this Background section is only for enhancement of understanding of the background of the invention, and therefore, it may contain information that does not form prior art.

SUMMARY

Aspects of one or more embodiments of the present invention relate to a clock channel including a transmission line for reflecting clock signals according to a clock frequency to increase the quality of received clock signals, a circuit board including the clock channel, and an electronic device including the same.

According to an aspect of an example embodiment of the present invention, an electronic device includes: a transmitter; a plurality of receivers; a channel coupling the transmitter to the plurality of receivers; and a transmission line coupled to an input of at least one receiver from among the plurality of receivers, the transmission line including: a reflection portion to reflect a clock signal propagating through the channel according to a clock frequency.

The transmission line may further include: a trace; and a reference plane; and the reflection portion may include: a plurality of pattern voids in the reference plane overlapping the trace.

The transmission line may further include: a trace; and a reference plane; and the reflection portion may include: a plurality of first portions of the trace; and a plurality of second portions of the trace alternately coupled in series with the first portions, the second portions having a width that is different from that of the first portions.

The reflection portion may further include: a plurality of pattern voids in the reference plane overlapping the trace.

The first portions may have a width that is smaller than that of the second portions, and the plurality of pattern voids may overlap the first portions.

The reflection portion may include a plurality of periods, each of the periods may include one of the first portions, an adjacent one of the second portions, and one of the pattern voids overlapping the one of the first portions, and a length of each of the periods may be equal to each other.

According to another aspect of an example embodiment of the present invention, a circuit board includes: a first terminal to be coupled to a transmitter; a plurality of second terminals to be coupled to a plurality of receivers; a channel to couple the transmitter to the plurality of receivers; and a transmission line coupled to at least one second terminal from among the plurality of second terminals, the transmission line including: a reflection portion to reflect a clock signal propagating through the channel according to a clock frequency.

The transmission line may further include: a trace; and a reference plane; and the reflection portion may include: a plurality of pattern voids in the reference plane overlapping the trace.

The transmission line may further include: a trace; and a reference plane; and the reflection portion may include: a plurality of first portions of the trace; and a plurality of second portions of the trace alternately coupled in series with the first portions, the second portions having a width that is different from that of the first portions.

The reflection portion may further include: a plurality of pattern voids in the reference plane overlapping the trace.

The first portions may have a width that is smaller than that of the second portions, and the plurality of pattern voids may overlap the first portions.

The reflection portion may include a plurality of periods, each of the periods may include one of the first portions, an adjacent one of the second portions, and one of the pattern voids overlapping the one of the first portions, and a length of each of the periods may be equal to each other.

According to another aspect of an example embodiment of the present invention, a clock channel to couple a transmitter to a plurality of receivers is provided, the clock channel including: a transmission line to be coupled to an input of at least one receiver from among a plurality of receivers, the transmission line including: a reflection portion to reflect a clock signal propagating through the clock channel according to a clock frequency.

The transmission line may further include: a trace; and a reference plane; and the reflection portion may include: a plurality of pattern voids in the reference plane overlapping the trace.

The transmission line may further include: a trace; and a reference plane; and the reflection portion may include: a plurality of first portions of the trace; and a plurality of second portions of the trace alternately coupled in series with the first portions, the second portions having a width that is different from that of the first portions.

The reflection portion may further include: a plurality of pattern voids in the reference plane overlapping the trace.

The first portions may have a width that is smaller than that of the second portions, and the plurality of pattern voids may overlap the first portions.

The reflection portion may include a plurality of periods, each of the periods may include one of the first portions, an adjacent one of the second portions, and one of the pattern voids overlapping the one of the first portions, and a length of each of the periods may be equal to each other.

A width of a first portion from among the plurality of first portions may be constant from a first end of the first portion to a second end of the first portion; a width of a second portion from among the plurality of second portions may be constant from a first end of the second portion to a second end of the second portion; and a pattern void from among the plurality of pattern voids overlapping the first portion from among the plurality of the first portions may extend through the reference plane.

A first end of the transmission line may be coupled to the input of the at least one receiver, and a second end of the transmission line may be terminated with a resistor.

BRIEF DESCRIPTION OF THE DRAWINGS

The above and other aspects and features of the present invention will become apparent to those skilled in the art from the following detailed description of the example embodiments with reference to the accompanying drawings.

DETAILED DESCRIPTION

Figure 1:
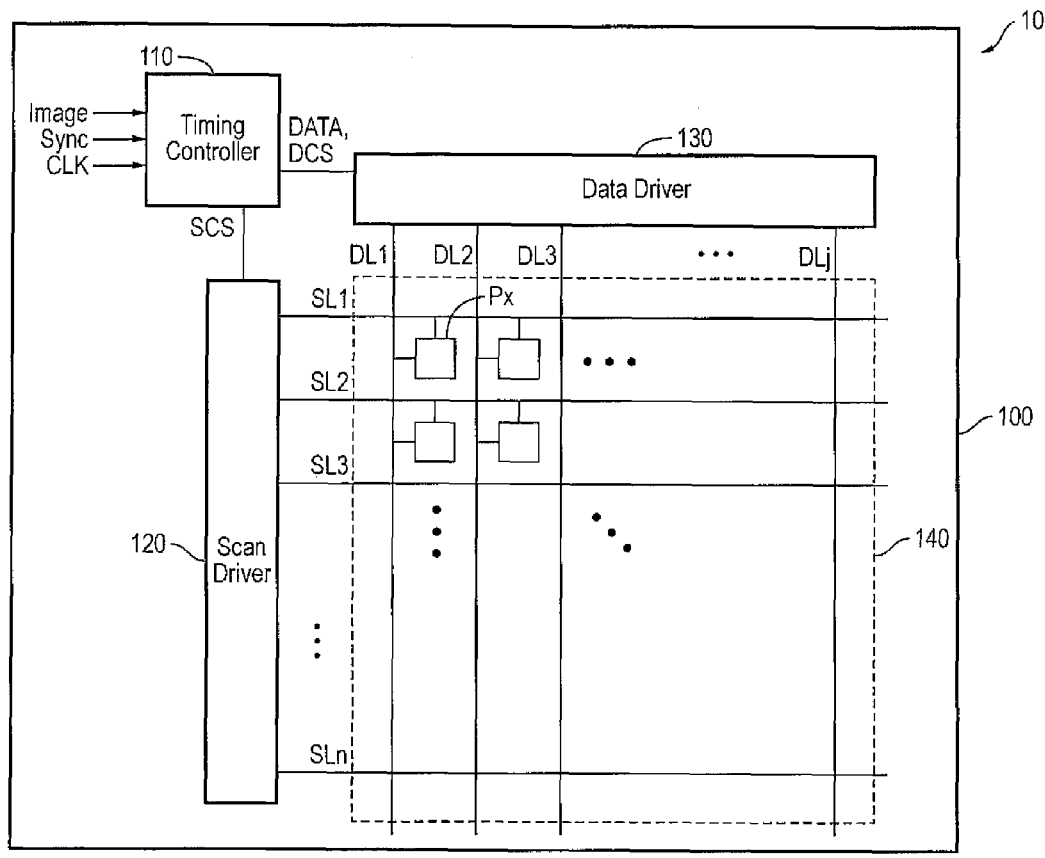
FIG. 1 illustrates an example application of a clock rate enhancement system in the context of an electronic device according to some embodiments of the present invention.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and components and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or the like without departing from the spirt or scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In order to reduce the jitter impact of a receiver's phase-locked loop, the forwarded clock rate should be as close to the data rate as possible. Some methods adjust the termination value at each receiver, as well as the distance between adjacent receivers, but these methods have limited success in practice.

Further, compared to point-to-point channels, reflections in multi-drop channels may be more difficult to manage. Some receivers are affected more by reflections, and may be the bottleneck to the achievable clock rate depending on the clock frequency and their relative locations, capacitance, load, etc. Accordingly, the clock signal received by some receivers may be weaker than that received by other receivers.

In some embodiments of the present invention, reflections may be controlled at inputs of the receivers having the weaker signal quality, so that the clock rate may be increased. For example, in some embodiments, a transmission line may include a reflection portion to reflect the clock signal propagating through a clock channel according to a clock frequency. In some embodiments, the reflection portion may include any one of a non-uniform trace and pattern voids, or a combination thereof, to reflect the clock signal according to the clock frequency. Accordingly, in some embodiments, the clock rate may be increased by using a frequency-selective reflection portion to locally enhance the clock signal for receivers that have relatively poor signal quality.

FIG. 1 illustrates an example application of a clock rate enhancement system in the context of an electronic device according to some embodiments of the present invention.

A clock rate enhancement system 10 includes a transmitter, a plurality of receivers, and at least one clock channel coupling the transmitter to the plurality of receivers as will be described in more detail below. The clock channel includes at least one transmission line as will be described in more detail with reference to FIGS. 2 through 4B.

Referring to FIG. 1, the clock rate enhancement system 10 in the context of an electronic device 100 may be any suitable electronic device, such as, for example, a display device, a mobile device, a touch pad, a computer, a blade server, a data storage cluster, etc.

If the electronic device 100 is a display device, the display device may include a timing controller 110, a scan driver 120, a data driver 130, and a plurality of pixels Px in a display area 140. Each of the plurality of pixels Px is coupled to respective ones of scan lines SL1 to SLn, where n is a positive integer, and data lines DL1 to DLj, where j is a positive integer, at crossing regions of the scan lines SL1 to SLn and the data lines DL1 to DLj. Each of the pixels Px receives a data signal from the data driver 130 through the respective one of the data lines DL1 to DLj, when a scan signal is received from the scan driver 120 through a respective one of the scan lines SL1 to SLn.

The timing controller 110 receives an image signal Image, a synchronization signal Sync, and a clock signal CLK from an external source (e.g., external to the timing controller). The timing controller 110 generates image data DATA, a data driver control signal DCS, and a scan driver control signal SCS. The synchronization signal Sync may include a vertical synchronization signal Vsync and a horizontal synchronization signal Hsync. The timing controller 110 transmits the image data DATA and the data driver control signal DCS to the data driver 130, and transmits the scan driver control signal SCS to the scan driver 120.

When the electronic device 100 is the display device, an example of the transmitter may include the timing controller 110, and an example of the plurality of receivers may include the data driver 130 including a plurality of data drivers (e.g., data driver integrated circuits) configured to generate the data signals. The plurality of data drivers may be coupled to the timing controller 110 via the clock channel (e.g., a common clock channel) in, for example, a daisy chain fashion. Each of the plurality of data drivers may receive clock signals (e.g., the data driver control signal DCS) through the clock channel. The clock signals may be utilized by the data drivers to properly receive the image data DATA sent from the timing controller. As will be described in further detail below, the transmission line may be coupled near (or at) an input of at least one of the shift registers to enhance the clock signal propagating therethrough at or according to a desired frequency (e.g., a clock rate).

Figure 2:
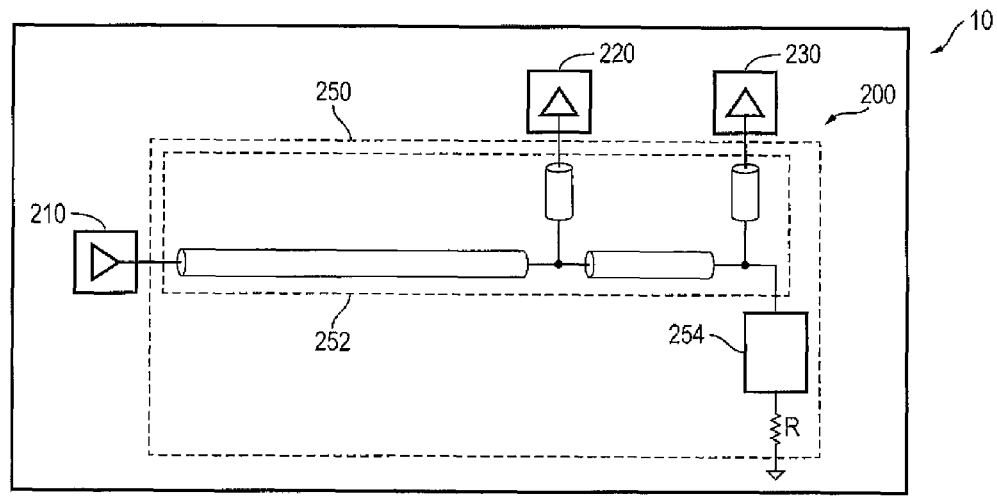
FIG. 2 is a schematic diagram illustrating a clock rate enhancement system including a clock channel for transmitting clock signals between devices, according to some embodiments of the present invention.

FIG. 2 is a schematic diagram illustrating further details of an example of a clock rate enhancement system 10 including a clock channel for transmitting clock signals between devices, according to some embodiments of the present invention.

Referring to FIG. 2, the clock rate enhancement system 10 includes a circuit or circuit board 200 including a transmitter 210, a plurality of receivers 220 and 230, and a clock channel 250 coupling the transmitter 210 to the plurality of receivers 220 and 230. The circuit board 200 may include any suitable circuit structure, for example, a printed circuit board (PCB), a flexible printed circuit board (FPCB), etc.

The clock channel 250 includes a channel 252 for transmitting a clock signal from the transmitter 210 to the receivers 220 and 230, and a transmission line 254 coupled near (or at) an input of the receiver 230 from among the receivers 220 and 230. The clock channel 250 may include a multi-drop channel and the receivers 220 and 230 may be coupled to the clock channel 250 in a daisy-chain fashion.

In the example shown in FIG. 2, the receiver 230 from among the receivers 220 and 230 is depicted as a receiver having relatively poor signal quality from among the receivers 220 and 230, and thus, the transmission line 254 is coupled near (or at) the input of the receiver 230 to enhance the signal quality of the receiver 230. Accordingly, while the example embodiment shown in FIG. 2 depicts one transmission line 254 coupled to the channel 252 near (or at) the input of the receiver 230 having the poor signal quality, the present invention is not limited thereto. For example, the transmission line 254 may be coupled near (or at) an input of the receiver 220 from among the receivers 220 and 230, and in some embodiments, another transmission line (e.g., a second transmission line) may be additionally coupled near (or at) the input of the receiver 220.

The transmission line 254 may be terminated with a resistor R for reflection control, and to set a DC bias of the input of the receiver 230. That is, a first end of the transmission line 254 may be coupled to (e.g., near or at) the input of the receiver 230 and a second end of the transmission line 254 may be terminated by the resistor R. The resistor R may have the same or substantially the same impedance value as that of the channel 252, and the input of the receivers 220 and 230 may be left unterminated as shown in FIG. 2. However, the present invention is not limited thereto. For example, the impedance of the resistor R may be any suitable impedance, and the input of the receivers 220 and 230 may be terminated within the receiver chips as well. For example, the impedance of the resistor R may be experimentally determined based on a desired reflection property of the transmission line 254. If the input of the receivers 220 and 230 are also terminated within the receiver chips, the reflection properties of the transmission line 254 may be fine-tuned with various different combinations of the impedance value of the resistor R and the impedance value of the terminated inputs within the receiver chips.

The transmission line 254 may have the same or substantially the same structure as any of the transmission lines described below with reference to FIGS. 3A through 4B. As will be further discussed in detail below, the transmission line 254 enhances (e.g., selectively enhances) reflection of the signal propagating through the channel 252 at desired frequencies (e.g., at frequencies at or near the clock rate) for the receiver 230.

Figure 3A:
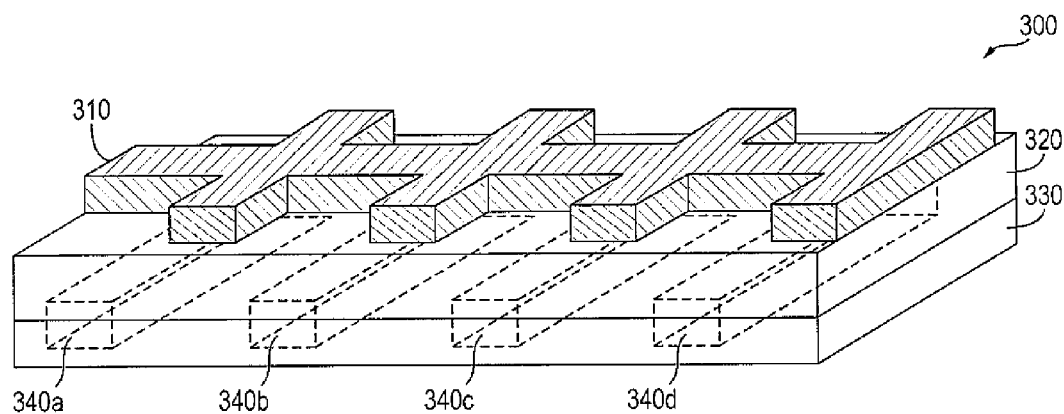
FIG. 3A illustrates a perspective view of a transmission line including reflections portions to reflect clock signals at a clock frequency, according to some embodiments of the present invention.

FIG. 3A illustrates a perspective view of a transmission line including reflections portions to reflect clock signals at a clock frequency, according to some embodiments of the present invention.

Referring to FIG. 3A, the transmission line 300 may include at least one non-uniform trace 310, an insulating substrate (e.g., a dielectric layer) 320, and at least one reference plane (e.g., a power or ground plane) 330. The insulating substrate 320 may include any suitable insulating or dielectric material. The non-uniform trace 310 and the reference plane 330 may include any suitable metal or conductive material.

The insulating substrate 320 may be formed on the reference plane 330, and the non-uniform trace 310 may be insulated (e.g., separated) from the reference plane 330 by the insulating substrate 320. The reference plane 330 may include one or more pattern voids 340a, 340b, 340c, and 340d located below and/or above the non-uniform trace 310 and overlapping the non-uniform trace 310. For convenience of description, the one or more patterned voids 340a, 340b, 340c, and 340d will be described hereafter as the patterned voids 340, unless otherwise specified. The reflection portion may include the non-uniform trace 310 and/or the pattern voids 340.

As shown in FIG. 3A, the transmission line 300 may be, for example, a microstrip transmission line, and thus, the reference plane 330 may be below the non-uniform trace 310. However, the present invention is not limited thereto, and the transmission line 300 may be, for example, a stripline transmission line including a reference plane above the non-uniform trace 310 and a reference plane below the non-uniform trace 310. In the case of a stripline transmission line, the pattern voids 340 may be located in the reference plane below and/or above the non-uniform trace 310.

The transmission line 300 including the pattern voids 340 may be formed using any suitable manufacturing process. For example, the pattern voids 340 may be formed in the reference plane 330 by at least partially etching away a portion of the reference plane 330 overlapping the non-uniform trace 310. The insulating substrate 320 may be formed on the reference plane 330, and the pattern voids 340 may be filled with the insulating substrate 320. The non-uniform trace 310 may be formed on the insulating substrate 320.

As will be described in more detail below, the reflection portion including the non-uniform trace 310 and/or the pattern voids 340 may be utilized to control reflections of clock signals propagating through the channel 252 to enhance the clock signals at frequencies at or near the clock rate.

Figure 3B:
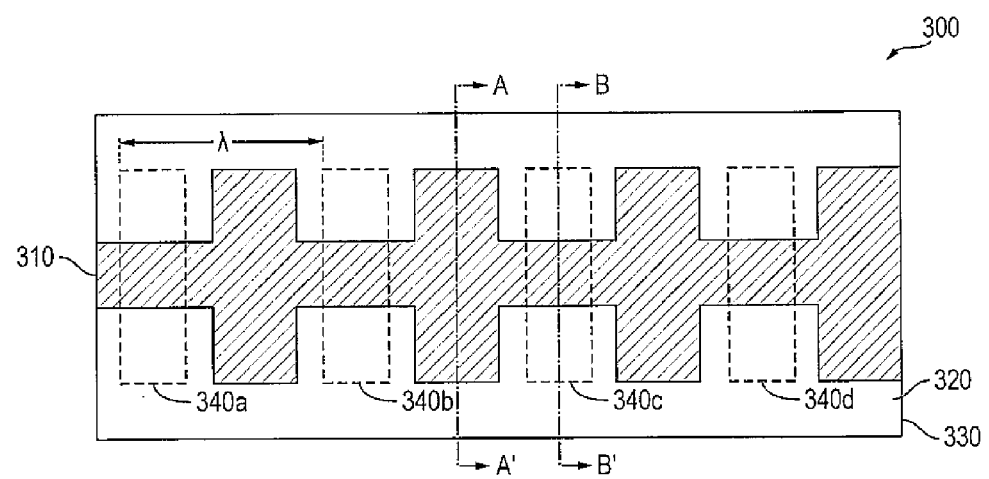
FIG. 3B illustrates a plan view of the transmission line shown in FIG. 3A.

FIG. 3B illustrates a plan view of the transmission line 300 shown in FIG. 3A.

Referring to FIG. 3B, the reference plane 330 may include the pattern voids 340 overlapping with the non-uniform trace 310. The non-uniform trace 310 may extend in a first direction, and the pattern voids 340 may be arranged along the first direction and may extend in a second direction crossing the first direction.

The pattern voids 340 and the non-uniform trace 310 may be arranged periodically. For example, four periods are shown herein, but the present invention is not limited thereto. Each period may include a period length $\Lambda$ (e.g., a physical length parallel to the first direction), and the period length $\Lambda$ of each of the periods may be equal to each other, where the term "equal to" may include "substantially equal to," and may include variations caused by imperfections in the manufacturing process or even intentional variations resulting in some change in performance, but still within the spirit and scope of the present invention. However, the present invention is not limited thereto, and one or more period lengths $\Lambda$ of one or more periods may be different from that of one or more other periods.

According to some embodiments of the present invention, a total reflection of the periods may peak at a frequency f defined by equation (1) below, when individual reflections from each period are in phase with one another.

$$f = \left(n + \frac{1}{2}\right)\frac{v_{\mathit{eff}}}{\Lambda} \quad (1)$$

In equation (1), $\Lambda$ is the physical length of each period, $V_{\mathit{eff}}$ is the effective signal propagation speed in each period, and n is an integer greater than or equal to 0 (n>=0).

Accordingly, the transmission line 300 according to some embodiments of the present invention, may enhance (e.g., selectively enhance) reflection of the clock signal near the clock rate according to the period length $\Lambda$ and a number of the periods of the reflection portion including the non-uniform trace 310 and the pattern voids 340. However, the present invention is not limited thereto, and as shown in FIGS. 4A and 4B, a transmission line according to some other embodiments of the present invention may enhance reflection of the clock signals near the clock rate according to the period length Λ and a number of the periods of a reflection portion including the non-uniform trace 310 without the pattern voids 340, or a reflection portion including the pattern voids 340 without the non-uniform trace 310.

Figure 4A:
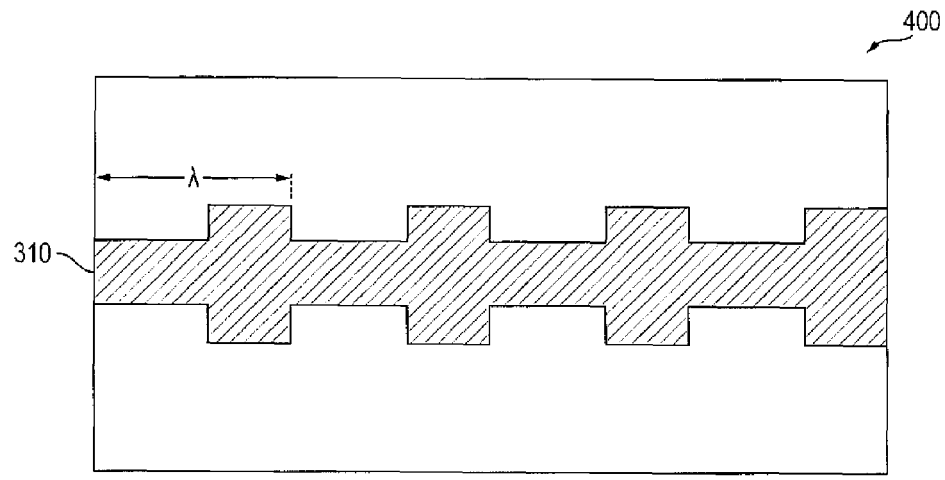
FIGS. 4A and 4B illustrate transmission lines according to some other embodiments of the present invention.
Figure 4B:
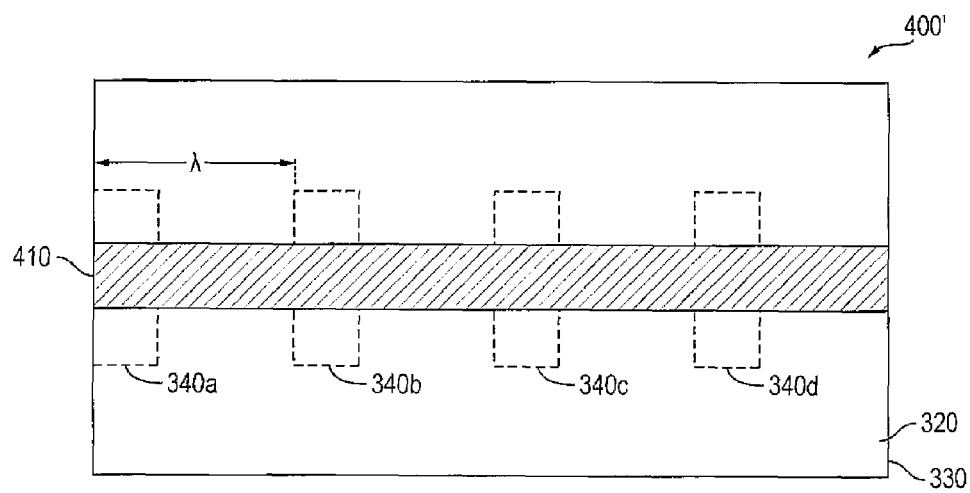

FIGS. 4A and 4B illustrate transmission lines according to some other embodiments of the present invention.

Referring to FIG. 4A, a transmission line 400 includes a reflection portion including the non-uniform trace 310 that is the same or substantially the same as that shown in FIGS. 3A through 3B, except the transmission line 400 does not include the pattern voids 340 in the reference plane, unlike that of the transmission line 300 shown in FIGS. 3A through 3B.

The reflection portion including the non-uniform trace 310 may be arranged periodically. For example, four periods are shown herein, but the present invention is not limited thereto. Each period may include a period length Λ (e.g., a physical length parallel to the first direction), and the period length Λ of each of the periods may be equal to each other, where the term "equal to" may include "substantially equal to," and may include variations caused by imperfections in the manufacturing process or even intentional variations resulting in some change in performance, but still within the spirit and scope of the present invention. However, the present invention is not limited thereto, and one or more period lengths Λ of one or more periods may be different from that of one or more other periods. A total reflection of the periods may peak at a frequency f defined by equation (1) above, when individual reflections from each period are in phase with one another.

Referring to FIG. 4B, a transmission line 400' includes a reflection portion including the pattern voids 340 in the reference plane that is the same or substantially the same as that shown in FIGS. 3A through 3B, but the transmission line 400 includes a uniform or substantially uniform trace 410, unlike that of the non-uniform trace 310 of the transmission line 300 shown in FIGS. 3A through 3B.

The reflection portion including the pattern voids 340 may be arranged periodically in the reference plane 330 and overlaps with the uniform trace 410. For example, four periods are shown herein, but the present invention is not limited thereto. Each period may include a period length Λ (e.g., a physical length parallel to the first direction), and the period length Λ of each of the periods may be equal to each other. However, the present invention is not limited thereto, and one or more period lengths Λ of one or more periods may be different from that of one or more other periods. A total reflection of the periods may peak at a frequency f defined by equation (1) above, when individual reflections from each period are in phase with one another.

A structure of the reflection portion including the non-uniform trace 310 as shown in FIGS. 3A, 3B, and 4A will be described below with reference to FIGS. 5A' and 5B, and a structure of the reflection portion including the pattern voids 340 as shown in FIGS. 3A, 3B, and 4B will be described below with reference to FIGS. 5C and 5D.

Figure 5A:
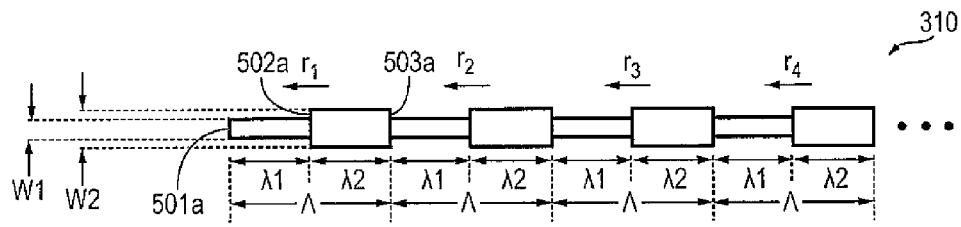
FIGS. 5A and 5B are plan views illustrating various different non-uniform trace structures, according to some embodiments of the present invention.
Figure 5B:
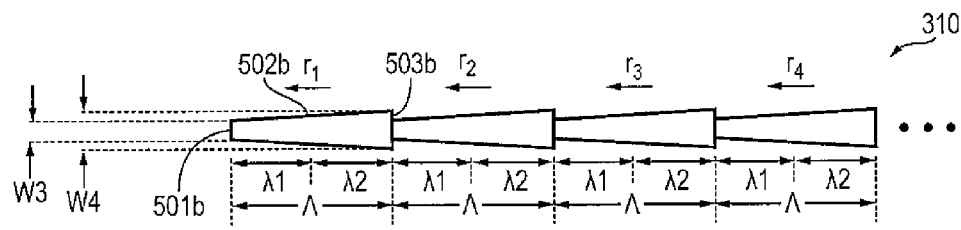

FIGS. 5A and 5B are plan views illustrating various different non-uniform trace 310 structures, according to some embodiments of the present invention.

As shown in FIGS. 5A and 5B, for each of the periods r1 through r4, the non-uniform trace 310 may have a plurality of widths in a direction perpendicular to the period length Λ. In other words, for each period, the width of the periods of the non-uniform trace 310 may vary at different sections along the length Λ.

For example, as shown in FIG. 5A, according to some embodiments, each of the periods r1 through r4 includes a first portion 501a, a second portion 503a opposite the first portion 501a, and a middle portion 502a coupling (e.g., connecting or between) the first portion 501a and the second portion 503a. A width W1 of the first portion 501a is different from (e.g., less than) a width W2 of the second portion 503a. The width W1 of the first portion 501a may be constant or substantially constant from a first end of the first portion 501a to a second end of the first portion 501a, and the width W2 of the second portion 503a may be constant or substantially constant from a first end of the second portion 503a to a second end of the second portion 503a. However, the present invention is not limited thereto.

In some embodiments, a plurality of second portions may be alternately coupled in series with a plurality of first portions. For example, the first portion 501a of the second period r2 is coupled to the second portion 503a of the first period r1, and the first portions 501a of each subsequent period are coupled to the second portions 503a of respective previous periods to form the non-uniform trace 310.

In some embodiments, the first portion 501a may have a quadrilateral shape including four right angles and four sides. Two of the sides that are parallel to each other may extend in the second direction and may each have a height equal to or substantially equal to the width W1. Two of the other sides that are parallel to each other may extend in the first direction and may each have a length equal to or substantially equal to a first length Δ1. The first length Δ1 may be greater than the width W1. However, the present invention is not limited thereto, for example, the quadrilateral shape may include no right angles and/or each of the four sides may be equal or substantially equal in length to each other.

In some embodiments, the second portion 503a may have a quadrilateral shape including four right angles and four sides. Two of the sides that are parallel to each other may extend in the second direction and may each have a height equal to or substantially equal to the width W2. Two of the other sides that are parallel to each other may extend in the first direction and may each have a length equal to or substantially equal to a second length λ2. The second length λ2 may be greater than the width W2. However, the present invention is not limited thereto, for example, the quadrilateral shape may include no right angles and/or each of the four sides may be equal or substantially equal in length to each other.

In some embodiment, the first length λ1 may be equal to or substantially equal to the second length λ2. However, the present invention is not limited thereto, and the first length λ1 may be less than the second length λ2, or the first length λ1 may be greater than the second length λ2.

The middle portion 502a includes at least one location where the width varies. That is, the middle portion 502a according to some embodiments of the present invention may include one or more step portions at which the width varies, but as will be described further below with reference to FIG. 5B, the present invention is not limited thereto.

In some embodiments, the middle portion 502a may be a section along the length Λ where the width W1 of the first portion 502a and the width W2 of the second portion 503a meet.

FIG. 5A shows that the width W1 of the first portion 501a is smaller than the width W2 of the second portion 503a, but the present invention is not limited thereto, and the width of the first portion 501a may be larger than the width of the second portion 503a depending on whether or not a positive reflection or a negative reflection is desired for the particular application. For example, if the first portion 501*a* has a larger width than that of the second portion 503*a*, the reflection at the period (e.g., at a first end of the period) may be negative, whereas if the first portion 501*a* has a smaller width than that of the second portion 503*a*, then the reflection at the period (e.g., the first end of the period) may be positive.

As shown in FIG. 5B, according to some embodiments, for each period r1 through r4, the width of the periods of the non-uniform trace 310 may gradually (e.g., continuously) vary along the period length $\Lambda$. In some embodiments, the period length $\Lambda$ of each period r1 through r4 may be equal to or substantially equal to one another, but the present invention is not limited thereto.

According to some embodiments, each of the periods r1 through r4 includes a first portion 501*b*, a second portion 503*b* opposite the first portion 501*b*, and a middle portion 502*b* coupling (e.g., connecting or between) the first portion 501*b* and the second portion 503*b*. A width W3 of the first portion 501*b* is different from (e.g., less than) a width W4 of the second portion 503*b*.

In some embodiments, a plurality of second portions may be alternately coupled in series with a plurality of first portions. For example, the first portion 501*b* of the second period r2 is coupled to the second portion 503*b* of the first period r1, and the first portions 501*b* of each subsequent period is coupled to the second portions 503*b* of respective previous periods to form the non-uniform trace 310.

In some embodiments, the first portion 501*b* may have a width that increases from a first end of the first portion 501*b* to a second end of the first portion 501*b*, and the second portion 503*b* may have a width that increases from a first end of the second portion 503*b* to a second end of the second portion 503*b*. However, the present invention is not limited thereto, for example, the first portion 501*b* may have a width that decreases from the first end of the first portion 501*b* to the second end of the first portion 501*b*, and the second portion 503*b* may have a width that decreases from the first end of the second portion 503*b* to the second end of the second portion 503*b*.

In some embodiments, the first portion 501*b* may have a trapezoidal shape and the second portion 503*b* may have a trapezoidal shape. However, the present invention is not limited thereto, and the first and second portions 501*b* and 503*b* may be any suitable shape (e.g., triangle, diamond, circle, etc.). For example, if the period has a triangular shape, the first portion 501*b* may have a triangular shape and the second portion 503*b* may have a trapezoidal shape. If the period has a circular shape, then the first portion 501*b* may be a semi-circle and the second portion 503*b* may be a semi-circle.

In some embodiments, the first portion 501*b* may be a section along the period length $\Lambda$ having the width W3.

In some embodiments, the second portion 503*b* may be a section along the period length $\Lambda$ having the width W4.

In some embodiments, the middle portion 502*b* includes at least one location where the width varies. That is, the middle portion 502*b* according to some embodiments of the present invention may include one or more portions at which the width varies continuously or gradually, but the present invention is not limited thereto.

In some embodiments, the middle portion 502*b* may extend from the first portion 501*b* to the second portion 503*b*. The middle portion 502*b* may include a first slope gradually (e.g., continuously) increasing from the first portion 501*b* to the second portion 503*b*, and may include a second slope gradually (e.g., continuously) decreasing from the first portion 501*b* to the second portion 503*b*. The first slope may be a mirror image of the second slope along an axis intersecting center points of the width W3 and the width W4 that is parallel to the period length $\Lambda$, but the present invention is not limited thereto.

FIG. 5B shows that the width of the first portion 501*b* is smaller than the width of the second portion 503*b*, but the present invention is not limited thereto, and the width of the first portion 501*b* may be larger than the width of the second portion 503*b* depending on whether or not a positive reflection or a negative reflection is desired based on the particular application. For example, if the first portion 501*b* has a larger width than that of the second portion 503*b*, the reflection at the period (e.g., at a first end of the period) may be negative, whereas if the first portion 501*b* has a smaller width than that of the second portion 503*b*, then the reflection at the period (e.g., at the first end of the period) may be positive.

As shown in FIG. 5A, the width of each period r1 through r4 may vary abruptly at one or more sections along the length $\Lambda$ of each period r1 through r4, or as shown in FIG. 5B the width of each period r1 through r4 may gradually (e.g., continuously) vary at multiple sections along the length $\Lambda$ of each period r1 through r4. Further, FIG. 5A shows each of the periods r1 through r4 including two rectangular shapes having different widths W1 and W2, and FIG. 5B shows each of the periods r1 through r4 including a single trapezium shape in which the width gradually (e.g., continuously) increases from the width W3 to the width W4. However, the manner in which the widths vary and the shape or shapes of the periods are not limited thereto, as long as the width varies at at least one section along the length $\Lambda$ within each of the periods, so that there is reflection at each period. For example, the shape(s) of the periods may include any suitable shape(s) (e.g., a triangle shape, a star shape, a diamond shape, a circle shape, etc.) in which the width(s) of the period varies at at least one section along the length $\Lambda$.

Figure 5C:
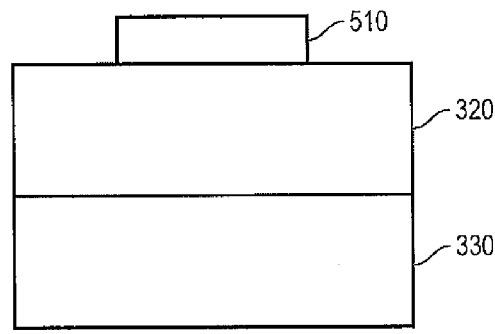
FIG. 5C illustrates a cross-sectional view taken along the line A-A' of the transmission line shown in FIG. 3B.
Figure 5D:
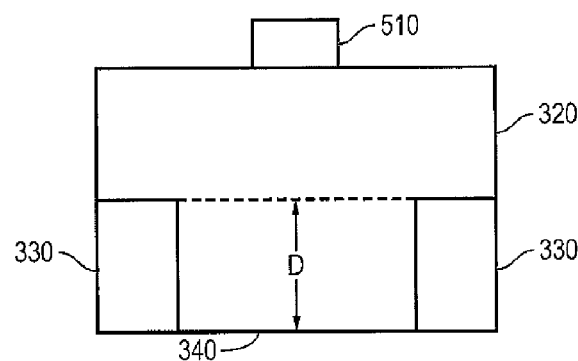
FIG. 5D illustrates a cross-sectional view taken along the line B-B' of the transmission line shown in FIG. 3B.

FIG. 5C illustrates a cross-sectional view taken along the line A-A' of the transmission line shown in FIG. 3B, and FIG. 5D illustrates a cross-sectional view taken along the line B-B' of the transmission line shown in FIG. 3B.

For ease of description, FIGS. 3A, 3B, 4A, 4B, 5C, and 5D are shown and described in the context of a transmission line including a reference plane only below the trace as shown in FIG. 3A above, for example, as in a microstrip transmission line. However, the present invention is not limited thereto, and as described above, a reference plane may be included above the trace and a reference plane may be included below the trace such as, for example, in the case of a stripline transmission line. When the transmission line includes the reference planes above and below the trace, the pattern voids may be included on the reference plane above the trace and/or on the reference plane below the trace.

As shown in FIG. 5C, a trace 510 may be separated from the reference plane 330 by the insulating substrate 320, and as shown in FIGS. 3A, 3B, and 4B, each of the pattern voids 340*a*, 340*b*, 340*c*, and 340*d* may overlap with the trace 510 and may cross the trace 510. The trace 510 shown in FIG. 5C may be the same or substantially the same as any one of the non-uniform trace 310 and uniform trace 410 as described above.

While FIGS. 3A and 3B show that the pattern voids 340 overlap portions of the non-uniform trace 310 having the smaller widths (e.g., the first portion 501*a* or 501*b* as described above with reference to FIGS. 5A and 5B), the present invention is not limited thereto. For example, the pattern voids 340 may overlap portions of the non-uniform trace 310 having the larger widths (e.g., the second portion 503a or 503b as described above with reference to FIGS. 5A and 5B), and in this case, a strength of corresponding reflections for each of the periods may be reduced.

As shown in FIG. 5D, a depth D of the pattern voids 340 may be equal to a thickness of a portion of the reference plane 330 overlapping the trace 510. In other words, the pattern voids 340 may extend entirely through the reference plane 330 in a thickness direction of the reference plane 330 overlapping the trace 510. However, the present invention is not limited thereto, for example, in some embodiments, the depth D of the pattern voids 340 may be less than a thickness of a portion of the reference plane 330 overlapping the trace 510, and/or the pattern voids 340 may not extend entirely through the reference plane 330 in the thickness direction of the reference plane 330.

According to some embodiments of the present invention, a shape (e.g., when viewed in a plan view) of the pattern voids 340 may be substantially rectangular. However, the present invention is not limited thereto, and in some embodiments, the shape (e.g., when viewed in a plan view) of the pattern voids 340 may be any suitable shape, for example, such as squares, circles, hexagons, triangles, trapezoids, etc. Further, in some embodiments, the shape (e.g., when viewed in a plan view) of one or more pattern voids 340 may be different from that of one or more other pattern voids 340. Regardless of the shape, however, the pattern voids 340 may be arranged periodically to overlap the trace 510, and each period may have the period length Λ as discussed above.

Figure 6A:
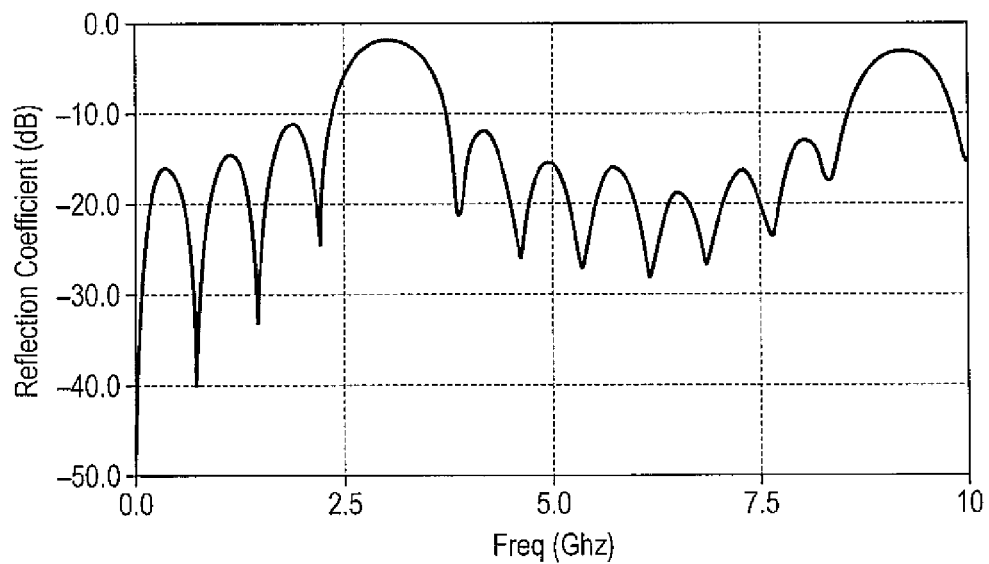
FIG. 6A is a graph illustrating a reflection spectrum of a transmission line having a structure that is the same or substantially the same as that shown in FIGS. 3A and 3B.
Figure 6B:
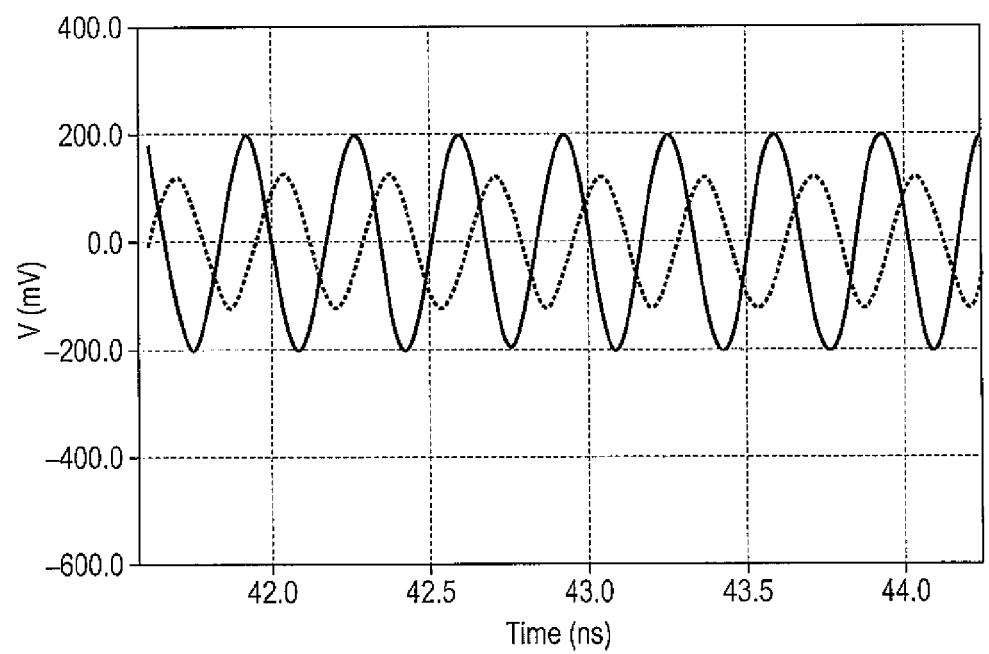
FIG. 6B is a graph illustrating received signals by receivers through a clock channel without the transmission line shown in FIGS. 3A and 3B.

FIG. 6A is a graph illustrating a reflection spectrum of a transmission line having a structure that is the same or substantially the same as that shown in FIGS. 3A and 3B. FIG. 6B is a graph illustrating received signals by receivers through a clock channel without the transmission line shown in FIGS. 3A and 3B, and FIG. 6C is a graph illustrating received signals by receivers through a clock channel including the transmission line shown in FIGS. 3A and 3B.

Figure 6C:
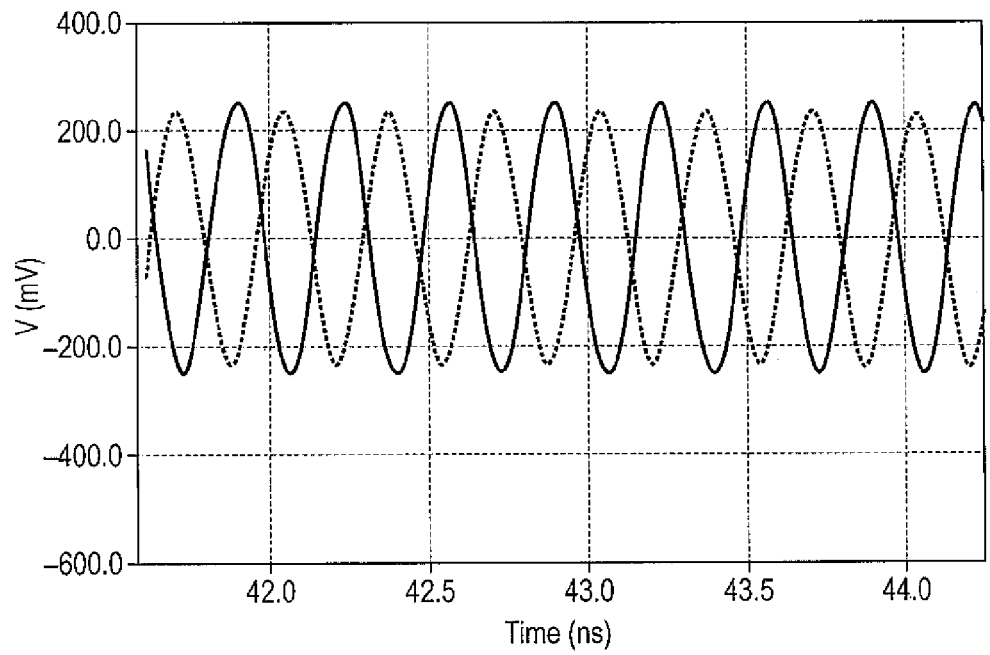
FIG. 6C is a graph illustrating received signals by receivers through a clock channel including the transmission line shown in FIGS. 3A and 3B.

For purpose of illustration, FIGS. 6A through 6C assume that the design goal is to send a 3 gigahertz (GHz) clock signal over a 800 millimeter (mm) long differential channel shared by two receivers, a first receiver and a second receiver. To improve the clock signal quality of the second receiver from among the two receivers, the transmission line 300 shown in FIGS. 3A and 3B above is coupled at (or near) the input of the second receiver (e.g., like that shown in FIG. 2 above). The transmission line 300 includes 4 periods, each period being 30 mm long (i.e., Λ =30 mm). The pattern voids 340 overlap with the non-uniform trace 310 at portions of the non-uniform trace 310 that has the smaller width (e.g., the first portions 501a or 501b as described above with reference to FIGS. 5A and 5B).

As shown in FIG. 6A, by including the transmission line 300 having the four 30 mm long periods (i.e., Λ =30 mm) of the non-uniform trace 310 and the pattern voids 340 overlapping the non-uniform trace 310, peak reflections occur at the 3 Ghz clock rate. Accordingly, the quality of the clock signal received by the second receiver may be enhanced.

For example, as shown in FIG. 6B, when the clock channel does not include the transmission line 300, the signal swing at the second receiver (as represented by the dotted lines) is equal to about 248 millivolts (mv) and the signal swing at the first receiver (as represented by the solid line) is equal to about 405 mv. In other words, the signal swing at the second receiver is only about 60% of the signal swing at the first receiver.

According to some embodiments of the present invention, as shown in FIG. 6C, when the clock channel includes the transmission line 300 at (or near) the input of the second receiver as described above, the signal swing of the first receiver is equal to about 500 mv, and the signal swing of the second receiver is equal to about 472 mv. Thus, the signal swing at the second receiver is improved or increased by about 90%, and even the signal swing at the first receiver is improved or increased by about 24%.

Figure 7:
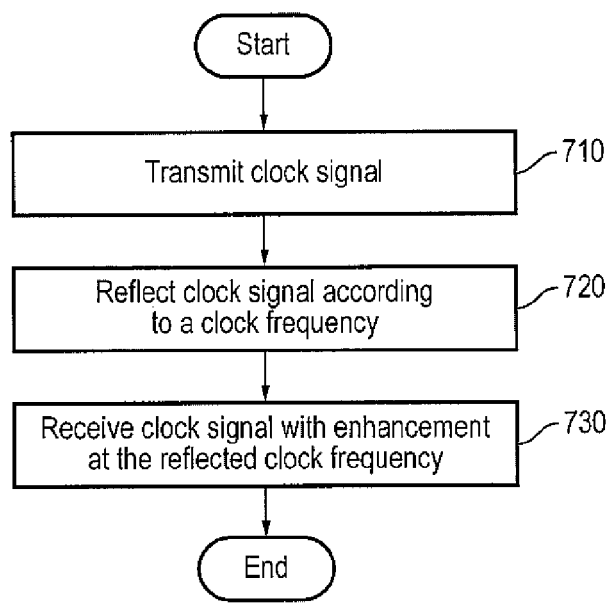
FIG. 7 illustrates a method for enhancing a clock rate in a multi-drop channel, according to some embodiments of the present invention

FIG. 7 illustrates a method for enhancing a clock rate in a multi-drop channel, according to some embodiments of the present invention. However, the present invention is not limited to the sequence or number of the operations of the method shown in FIG. 7, and can be altered into any desired sequence or number of operations as recognized by a person of ordinary skill in the art. For example, in some embodiments, the order may vary, or the method may include fewer or additional operations.

Referring to FIG. 7, the method starts and at operation 710, a clock signal is transmitted by a transmitter to a clock channel. At operation 720, the clock signal is reflected by a reflection portion according to a clock frequency. The reflection portion may include any one of a non-uniform trace 310 and pattern voids 340 in a reference plane as described above, or any combination thereof. At operation 730, the clock signal with enhancements at the reflected clock frequency is received by a receiver coupled to the clock channel.

Accordingly, in some embodiments of the present invention, the clock rate may be increased by using a frequency-selective reflection portion to locally enhance the clock signal for receivers that have relatively poor signal quality.

In some embodiments, a transmission line having the reflection portion may be coupled to an input of the receiver having the poor signal quality, and the reflection portion may reflect clock signals according to the clock frequency at the input of the receiver.

In some embodiments, the reflection portion may include any one of a non-uniform trace and pattern voids, or a combination thereof, to reflect the clock signal according to the clock frequency.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:
1. An electronic device comprising:
a transmitter;
a plurality of receivers;
a channel coupling the transmitter to the plurality of receivers; and a transmission line coupled to an input of at least one receiver from among the plurality of receivers, the transmission line comprising:
a reflection portion coupled between the input of the at least one receiver and a power source, the reflection portion being configured to enhance reflection of a clock signal propagating through the channel at a predetermined frequency.

2. The electronic device of claim 1, wherein:
the transmission line further comprises:
a trace; and
a reference plane; and
the reflection portion comprises:
a plurality of pattern voids in the reference plane overlapping the trace.

3. The electronic device of claim 1, wherein
the transmission line further comprises:
a trace; and
a reference plane; and
the reflection portion comprises:
a plurality of first portions of the trace; and
a plurality of second portions of the trace alternately coupled in series with the first portions, the second portions having a width that is different from that of the first portions.

4. The electronic device of claim 3, wherein the reflection portion further comprises:
a plurality of pattern voids in the reference plane overlapping the trace.

5. The electronic device of claim 4, wherein the first portions have a width that is smaller than that of the second portions, and
the plurality of pattern voids overlaps the first portions.

6. The electronic device of claim 5, wherein the reflection portion comprises a plurality of periods, each of the periods comprising one of the first portions, an adjacent one of the second portions, and one of the pattern voids overlapping the one of the first portions, and
wherein a length of each of the periods is equal to each other.

7. A circuit board comprising:
a first terminal to be coupled to a transmitter;
a plurality of second terminals to be coupled to a plurality of receivers;
a channel to couple the transmitter to the plurality of receivers; and
a transmission line coupled to at least one second terminal from among the plurality of second terminals, the transmission line comprising:
a reflection portion coupled between the at least one second terminal and a power source, the reflection portion being configured to enhance reflection of a clock signal propagating through the channel at a predetermined frequency.

8. The circuit board of claim 7, wherein:
the transmission line further comprises:
a trace; and
a reference plane; and
the reflection portion comprises:
a plurality of pattern voids in the reference plane overlapping the trace.

9. The circuit board of claim 7, wherein
the transmission line further comprises:
a trace; and
a reference plane; and
the reflection portion comprises:
a plurality of first portions of the trace; and
a plurality of second portions of the trace alternately coupled in series with the first portions, the second portions having a width that is different from that of the first portions.

10. The circuit board of claim 9, wherein the reflection portion further comprises:
a plurality of pattern voids in the reference plane overlapping the trace.

11. The circuit board of claim 10, wherein the first portions have a width that is smaller than that of the second portions, and
the plurality of pattern voids overlaps the first portions.

12. The circuit board of claim 11, wherein the reflection portion comprises a plurality of periods, each of the periods comprising one of the first portions, an adjacent one of the second portions, and one of the pattern voids overlapping the one of the first portions, and
wherein a length of each of the periods is equal to each other.

13. A clock channel to couple a transmitter to a plurality of receivers, the clock channel comprising:
a transmission line to be coupled to an input of at least one receiver from among a plurality of receivers, the transmission line comprising:
a reflection portion coupled between the input of the at least one receiver and a power source, the reflection portion being configured to enhance reflection of a clock signal propagating through the clock channel at a predetermined frequency.

14. The clock channel of claim 13, wherein:
the transmission line further comprises:
a trace; and
a reference plane; and
the reflection portion comprises:
a plurality of pattern voids in the reference plane overlapping the trace.

15. The clock channel of claim 13, wherein
the transmission line further comprises:
a trace; and
a reference plane; and
the reflection portion comprises:
a plurality of first portions of the trace; and
a plurality of second portions of the trace alternately coupled in series with the first portions, the second portions having a width that is different from that of the first portions.

16. The clock channel of claim 15, wherein the reflection portion further comprises:
a plurality of pattern voids in the reference plane overlapping the trace.

17. The clock channel of claim 16, wherein the first portions have a width that is smaller than that of the second portions, and
the plurality of pattern voids overlaps the first portions.

18. The clock channel of claim 17, wherein the reflection portion comprises a plurality of periods, each of the periods comprising one of the first portions, an adjacent one of the second portions, and one of the pattern voids overlapping the one of the first portions, and
wherein a length of each of the periods is equal to each other.

19. The clock channel of claim 18, wherein:
a width of a first portion from among the plurality of first portions is constant from a first end of the first portion to a second end of the first portion;

a width of a second portion from among the plurality of second portions is constant from a first end of the second portion to a second end of the second portion; and a pattern void from among the plurality of pattern voids overlapping the first portion from among the plurality of the first portions extends through the reference plane.

20. The clock channel of claim 18, wherein a first end of the transmission line is coupled to the input of the at least one receiver, and a second end of the transmission line is terminated with a resistor.

* * * * *